United States Patent
Yamashita et al.

(10) Patent No.: US 7,826,014 B2
(45) Date of Patent: Nov. 2, 2010

(54) SEMI-TRANSPARENT TFT ARRAY SUBSTRATE, AND SEMI-TRANSPARENT LIQUID CRYSTAL DISPLAY WITH TRANSPARENT PIXEL ELECTRODE AND CONTRAST REDUCTION PREVENTIVE ELECTRODE CONNECTED IN THE SAME LAYER

(75) Inventors: Shinji Yamashita, Kumamoto (JP); Yuichi Masutani, Tokyo (JP); Shingo Nagano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 42 days.

(21) Appl. No.: 11/372,086

(22) Filed: Mar. 10, 2006

(65) Prior Publication Data

US 2006/0289869 A1 Dec. 28, 2006

(30) Foreign Application Priority Data

Jun. 28, 2005 (JP) ............................. 2005-188055

(51) Int. Cl.
*G02F 1/1343* (2006.01)

(52) U.S. Cl. ............................ 349/114; 349/39; 349/54; 349/55

(58) Field of Classification Search .................. 349/54, 349/55, 192, 114
See application file for complete search history.

(56) References Cited

U.S. PATENT DOCUMENTS 6,195,140 B1 2/2001 Kubo et al.

6,710,827 B2 * 3/2004 Kubo et al. ................... 349/55
6,833,883 B2 * 12/2004 Park et al. ..................... 349/43
7,250,996 B2 * 7/2007 Yoshida et al. ............. 349/114
2004/0105058 A1 * 6/2004 Lu ............................. 349/114
2006/0050213 A1 * 3/2006 Masutani et al. ........... 349/114

FOREIGN PATENT DOCUMENTS

| JP | 2001-343660 | 12/2001 |
| KR | 10-2004-0024378 | 3/2004 |
| KR | 10-2004-0039500 | 5/2004 |

* cited by examiner

*Primary Examiner*—Andrew Schechter
(74) *Attorney, Agent, or Firm*—Oblon, Spivak, McClelland, Maier & Neustadt, L.L.P.

(57) ABSTRACT

A semi-transparent TFT array substrate has a TFT including a source electrode, a gate electrode, and a drain electrode. The substrate also has an auxiliary capacitive wiring and a reflective pixel electrode. Further, the substrate has a transparent pixel electrode including an electrode extending from a corner of the rest of the transparent pixel electrode to an edge of the auxiliary capacitive wiring closest to a gate wiring connected to the gate electrode. In addition, the substrate has a source wiring connected to the source electrode. The auxiliary capacitive wiring overlaps a space existing between the reflective pixel electrode and the source wiring. The electrode is disposed between the reflective pixel electrode and the source wiring. A connection which connects the electrode and the rest of the transparent pixel electrode does not overlap the auxiliary capacitive wiring in a plan view. The connection does not overlap the gate wiring.

8 Claims, 11 Drawing Sheets

F I G . 4
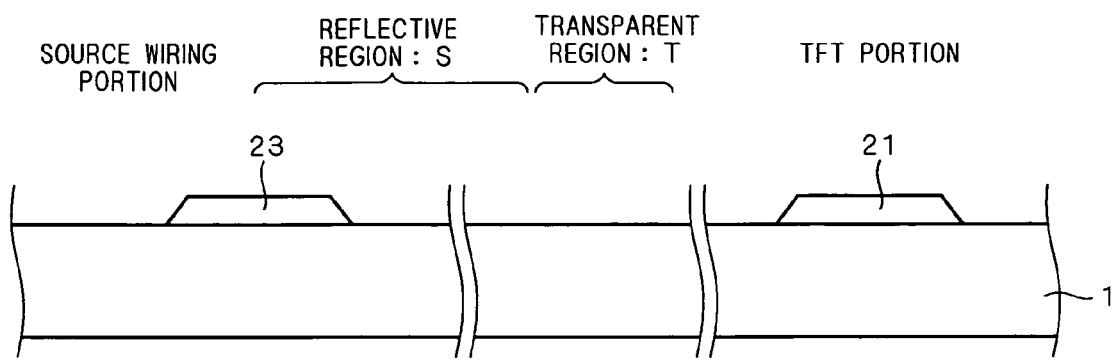
F I G . 5
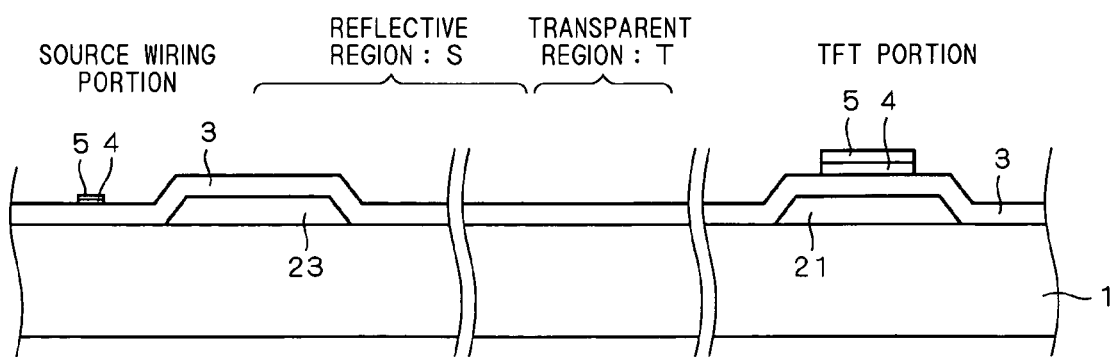

FIG. 12 -- RELATED ART

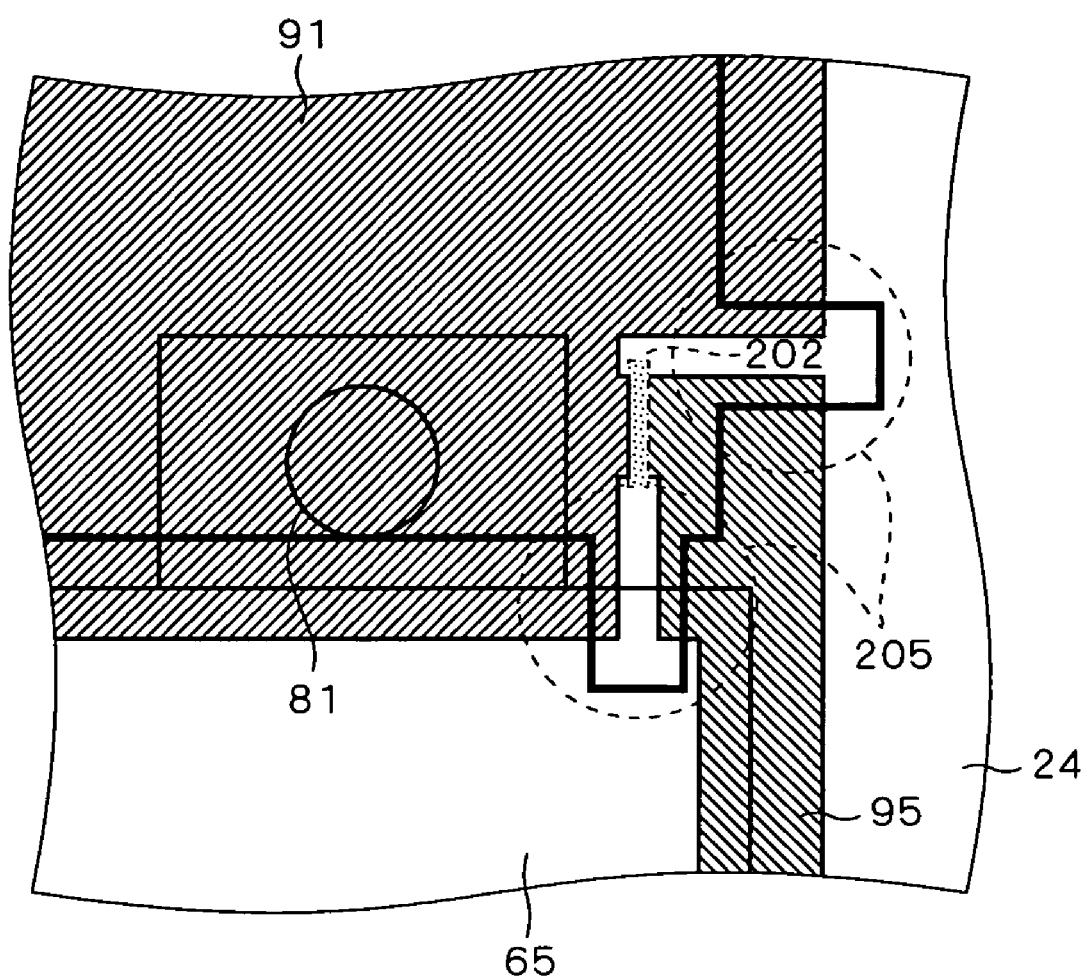
F I G . 1 5

SEMI-TRANSPARENT TFT ARRAY SUBSTRATE, AND SEMI-TRANSPARENT LIQUID CRYSTAL DISPLAY WITH TRANSPARENT PIXEL ELECTRODE AND CONTRAST REDUCTION PREVENTIVE ELECTRODE CONNECTED IN THE SAME LAYER

BACKGROUND OF THE INVENTION

1. Field of the Invention

The present invention relates to an active matrix type liquid crystal display intended for use as a display device in an OA device and the like for displaying images and character information. More specifically, the present invention relates to a semi-transparent liquid crystal display with a transparent region for allowing light to pass through a pixel region, and a reflective pixel electrode for reflecting ambient light.

2. Description of the Background Art

In a semi-transparent TFT (thin-film transistor) array substrate (which will also be referred to simply as "TFT array substrate") adopted in a commonly-used conventional semi-transparent liquid crystal display, a transparent region for allowing backlight on the rear side of a display screen to pass therethrough, and a reflective region for reflecting ambient light entering a liquid crystal layer are formed in each pixel.

As a known structure and a manufacturing method of this TFT array substrate for use as a semi-transparent liquid crystal display, a reflective pixel electrode forming the reflective region, a source wiring with a source electrode and a drain electrode are formed in the same layer to simplify manufacturing process steps.

When the source wiring and the reflective pixel electrode are formed in the same layer in the semi-transparent liquid crystal display, certain space should be maintained between the source wiring and the reflective pixel electrode to avoid a damage caused by a short circuit therebetween. The lowermost layer of this space is provided with an auxiliary capacitive electrode and an auxiliary capacitive wiring. Thus an opposed electrode formed in a substrate opposite to the TFT array substrate is arranged to face the auxiliary capacitive electrode and the auxiliary capacitive wiring.

The technique relevant to the present invention is disclosed in Japanese Patent Application Laid-Open No. 2001-343660.

In the TFT array substrate with the conventional structure, the auxiliary capacitive electrode, auxiliary capacitive wiring and the opposed electrode are at the same potential. This means no electric field is applied to a liquid crystal layer between the auxiliary capacitive electrode, auxiliary capacitive wiring and the opposed electrode. As a result, light entering the display screen to be reflected by the auxiliary capacitive electrode and the auxiliary capacitive wiring provided between the source wiring and the reflective pixel electrode cannot be cut off by an electric field, leading to reduced reflective contrast.

SUMMARY OF THE INVENTION

In a semi-transparent liquid crystal display in which a source wiring and a reflective pixel electrode are formed in the same layer, it is an object of the present invention to avoid reflective contrast reduction even when the source wiring and the reflective pixel electrode are spaced apart from each other, while allowing the semi-transparent liquid crystal display to repair a point defect without causing a short circuit between a transparent pixel electrode and an auxiliary capacitive wiring.

According to an aspect of the present invention, a semi-transparent TFT array substrate includes an auxiliary capacitive wiring, a transparent pixel electrode and a contrast reduction preventive electrode. The auxiliary capacitive wiring includes an auxiliary capacitive electrode formed on an insulation substrate. The transparent pixel electrode is formed in a transparent region and above the insulation substrate. The contrast reduction preventive electrode is formed in the reflective region. The contrast reduction preventive electrode and the transparent pixel electrode are formed in the same layer. A connection for connecting the contrast reduction preventive electrode and the transparent pixel electrode is formed, in such a position that the connection does not overlap the auxiliary capacitive wiring in plan view.

As a result of the existence of the contrast reduction preventive electrode, an electric field is applied to a liquid crystal layer between the contrast reduction preventive electrode and an opposed electrode. This prevents reflected light from the auxiliary capacitive electrode from appearing on a display screen to thereby provide excellent display characteristic with high reflective contrast. Further, a connection for connecting the contrast reduction preventive electrode and the transparent pixel electrode is formed, in such a position that the connection does not overlap the auxiliary capacitive wiring in plan view. Hence, when the contrast reduction preventive electrode is cut off at the connection with the transparent pixel electrode, the transparent pixel electrode is prevented from being short circuited with the auxiliary capacitive wiring.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4 through 7 are sectional views showing the steps of manufacturing the semi-transparent TFT array substrate constituting the semi-transparent liquid crystal display according to the first preferred embodiment;

FIG. 15 is an enlarged top view showing the vicinity of a connection of a transparent pixel electrode in a semi-transparent TFT array substrate constituting a semi-transparent liquid crystal display according to a third preferred embodiment of the present invention.

DESCRIPTION OF THE PREFERRED EMBODIMENTS

First Preferred Embodiment

<A-0. Background Art>

Figure 1:
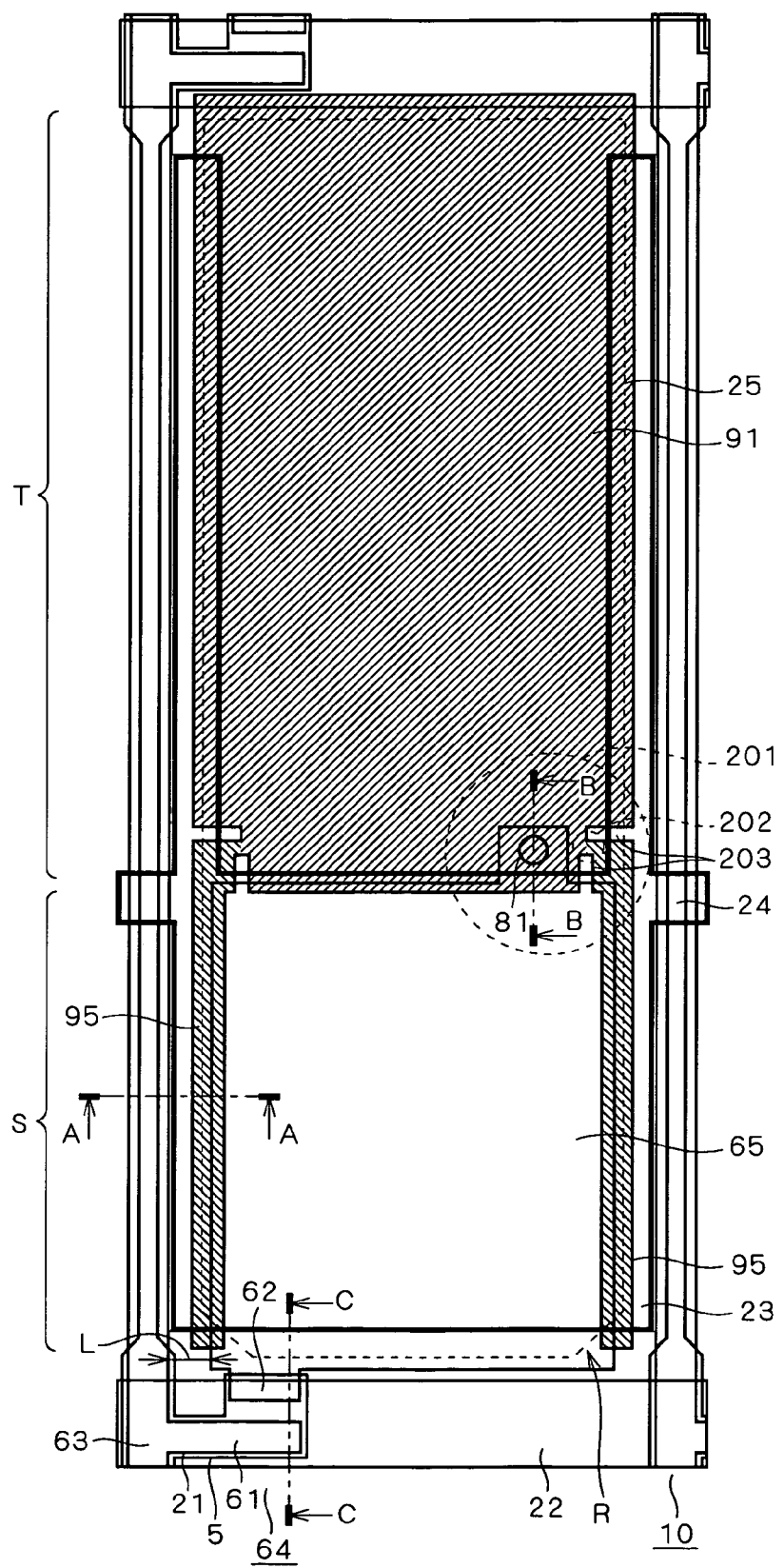
FIG. 1 is a plan view showing a pixel of a semi-transparent TFT array substrate constituting a semi-transparent liquid crystal display according to a first preferred embodiment of the present invention.

In a semi-transparent liquid crystal display according to the background art of the present invention, a contrast reduction preventive electrode is provided in the uppermost layer of a reflective region in a TFT array substrate. The contrast reduction preventive electrode is arranged between a source wiring and a reflective pixel electrode.

An electric field is applied to a liquid crystal layer between the contrast reduction preventive electrode and an opposed electrode by the formation of the contrast reduction preventive electrode. This prevents reflected light from an auxiliary capacitive electrode from appearing on a display screen to thereby provide excellent display characteristic with high reflective contrast.

On the other hand, due to the arrangement of the contrast reduction preventive electrode in the uppermost layer of the reflective region, the surface of the opposed electrode and the surface of the contrast reduction preventive electrode may be short circuited due to the existence of a foreign conductive substance therebetween, for example.

The distance between the TFT array substrate and a color filter substrate in the reflective region is half the distance therebetween in a transparent region. Thus the surface of the contrast reduction preventive electrode and the surface of the opposed electrode are short circuited even when a foreign substance has a height that is half the distance between the TFT array substrate and the color filter substrate in the transparent region. As a result, a corresponding pixel becomes a point defect.

A pixel subjected to the short circuit generates a spot defect in the case of N/W (normally white) which allows passing of light when no voltage is applied between the opposed electrode and pixel electrodes (including transparent pixel electrode and reflective pixel electrode) formed in the TFT array substrate. A pixel subjected to the short circuit generates a black dot defect in the case of N/B (normally black) which does not allow passing of light when no voltage is applied.

Semi-transparent liquid crystal display panels are manufactured under the condition of normally white. Thus the generation of a short circuit results in the generation of a spot defect.

As discussed, when a foreign conductive substance is held between the contrast reduction preventive electrode in the uppermost layer of the reflective region and the opposed electrode to cause a point defect as a result of a short circuit between the surfaces of the contrast reduction preventive electrode and the opposed electrode, the contrast reduction preventive electrode should be cut off by a laser beam to repair a point defect.

However, a connection for connecting the contrast reduction preventive electrode and the transparent pixel electrode overlaps an auxiliary capacitive wiring formed thereunder in plan view.

Hence, after the contrast reduction preventive electrode is cut off from the transparent pixel electrode, the transparent pixel electrode may be short circuited with the auxiliary capacitive wiring at the connection.

In view of the above, the present invention is intended to provide a TFT array substrate capable of repairing a point defect by cutting off the contrast reduction preventive electrode without causing a short circuit between the transparent pixel electrode and the auxiliary capacitive wiring.

Next, a semi-transparent TFT array substrate (which will also be referred to simply as "TFT array substrate") 10 constituting a semi-transparent liquid crystal display and a method of manufacturing the TFT array substrate 10 according to preferred embodiments of the present invention will be described with reference to drawings. In the drawings, the same reference numerals designate the same or substantially the same structures, and will not be repeatedly discussed.

<A-1. Overall Structure>

Figure 2:
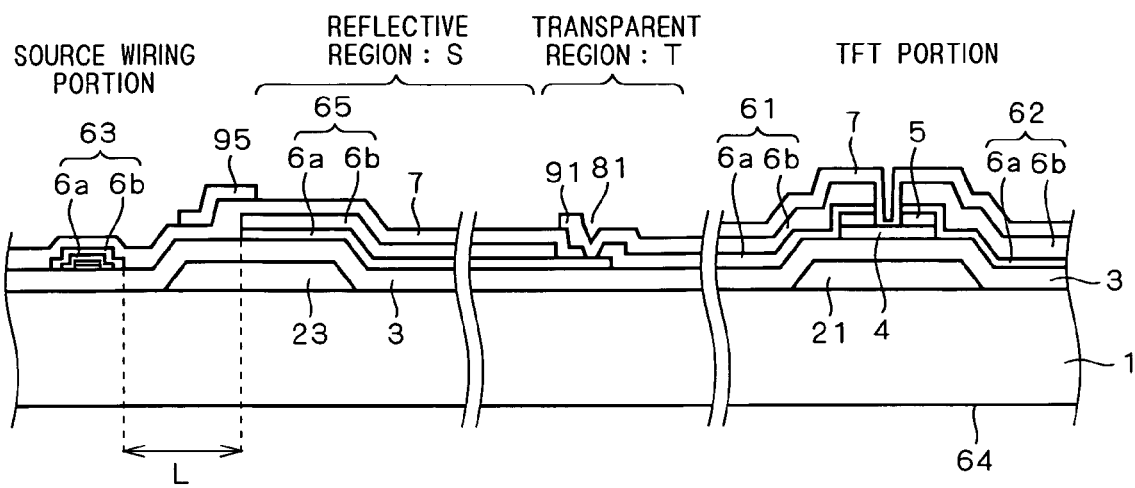
FIG. 2 is a sectional view showing the pixel of the semi-transparent TFT array substrate constituting the semi-transparent liquid crystal display according to the first preferred embodiment.
Figure 3:
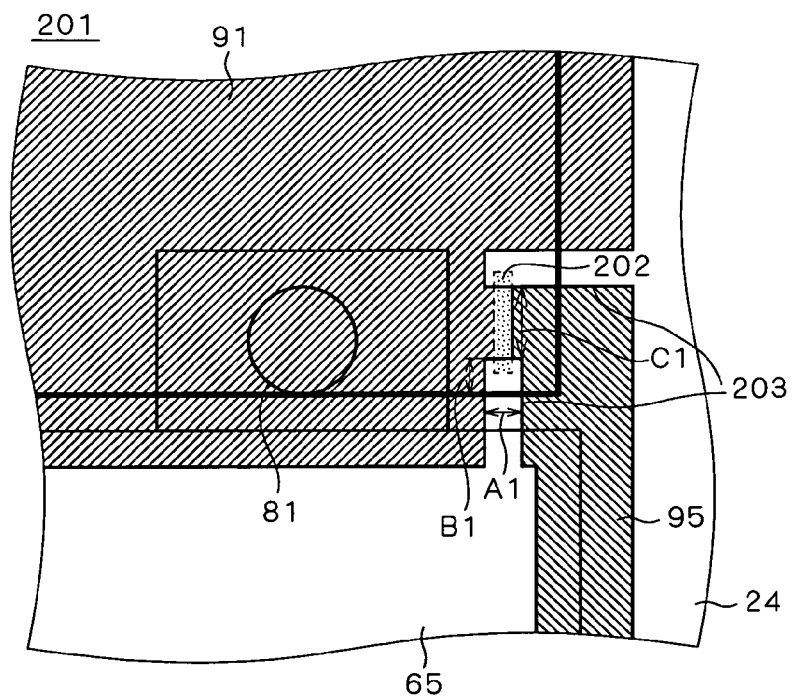
FIG. 3 is an enlarged top view showing the vicinity of a connection of a transparent pixel electrode in the semi-transparent TFT array substrate constituting the semi-transparent liquid crystal display according to the first preferred embodiment.

FIG. 1 is a plan view schematically showing the structure of the TFT array substrate 10 according to a first preferred embodiment of the present invention. FIG. 2 is a sectional view taken along an arrow A-A (at a source wiring portion and a reflective region S), an arrow B-B (at a transparent region T), and an arrow C-C (at a TFT portion). FIG. 3 is an enlarged top view showing a connection 202 and its vicinity formed in a transparent pixel electrode that constitutes the TFT array substrate 10.

FIGS. 4, 5, 6 and 7 are sectional views showing a method of manufacturing the TFT array substrate 10 according to the first preferred embodiment. FIGS. 8, 9, 10 and 11 are plan views showing the method of manufacturing the TFT array substrate 10 according to the first preferred embodiment.

In FIG. 1, each pixel on the TFT array substrate 10 includes the transparent region T for allowing light to pass therethrough, and the reflective region S for reflecting ambient light entering a liquid crystal layer.

With reference to FIGS. 1 and 2, a gate wiring 22 with a gate electrode 21 formed by a first conductive film and an auxiliary capacitive wiring 24 (Cs wiring shown in bold lines in FIG. 1) are formed on a transparent insulation substrate (insulation substrate) 1 that is a glass substrate, for example. The auxiliary capacitive wiring 24 includes a first auxiliary capacitive electrode 23 and a second auxiliary capacitive electrode 25 for preventing the leakage of backlight and for maintaining a voltage level for a certain period of time. A first insulation film 3 is formed over the gate wiring 22 and the auxiliary capacitive wiring 24.

A semiconductor active film 4 as a semiconductor layer and an ohmic contact film 5 are formed over the gate electrode 21 with the first insulation film (gate insulation film) 3 held therebetween. The first insulation film 3, the semiconductor active film 4, the ohmic contact film 5, the gate electrode 21, a source electrode 61 and a drain electrode 62 together form a TFT 64 as a switching element.

A source wiring 63 extending from the source electrode 61 is arranged such that the source wiring 63 intersects the gate wiring 22 with the first insulation film 3 held therebetween. The semiconductor active film 4 and the ohmic contact film 5 remain in this intersection and in the source wiring 63 to increase a breakdown voltage.

The reflective region S is formed by a reflective pixel electrode 65 extending from the drain electrode 62. The reflective pixel electrode 65 is formed by a second conductive film. As the second conductive film, a thin film with a metal film having a high reflectance at least on its surface layer is used.

In order to avoid a defect caused by a short circuit between the reflective pixel electrode 65 and the source wiring 63, the reflective pixel electrode 65 is spaced apart from the source wiring 63 a predetermined distance L (which is preferably about 5 μm to 10 μm).

A second insulation film 7 is formed to cover the above-discussed constituent elements. A contact hole 81 is defined by removing a part of the second insulation film 7 on the reflective pixel electrode 65.

A transparent pixel electrode 91 formed by a conductive film with high transmittance (hereinafter will be referred to as transparent conductive film) in an upper layer of the contact hole 81 to thereby define the transparent region T.

That is, the transparent pixel electrode 91 is formed in the transparent region T above the transparent insulation substrate 1.

The transparent pixel electrode 91 is electrically connected through the contact hole 81 to the reflective pixel electrode 65. The transparent pixel electrode 91 is also electrically connected through the reflective pixel electrode 65 to the drain electrode 62.

A contrast reduction preventive electrode 95 formed by a transparent conductive film is arranged over the space L between the reflective pixel electrode 65 and the source wiring 63 with the second insulation film 7 held therebetween. The contrast reduction preventive electrode 95 is formed in the same layer as the transparent pixel electrode 91 in the reflective region S.

In the first preferred embodiment, the contrast reduction preventive electrode 95 is formed along and substantially parallel with the source wiring 63.

<A-2. Structure of Connection>

The connection 202 for connecting the contrast reduction preventive electrode 95 and the transparent pixel electrode 91 is arranged such that the connection 202 does not overlap the auxiliary capacitive wiring 24 in plan view.

When a foreign conductive substance is held between the contrast reduction preventive electrode 95 and an opposed electrode, a short circuit may be generated between the contrast reduction preventive electrode 95 and the opposed electrode. In this case, as discussed later, the contrast reduction preventive electrode 95 is cut off from the transparent pixel electrode 91 at the connection 202 by laser cutting.

FIG. 3 is an enlarged top view of a vicinity 201 of the connection 202. With reference to FIG. 3, the connection 202 is held between a pair of slits 203 formed in the transparent pixel electrode 91 or the contrast reduction preventive electrode 95.

When a short circuit is generated, the contrast reduction preventive electrode 95 is cut off along the connection 202 by laser cutting.

Next, the dimensions of the slits 203 are discussed. In FIG. 3, a width A1 of each slit 203 is limited to some degree by the position of the contact hole 81. The greater width A1 results in a wider area between the contrast reduction preventive electrode 95 and the opposed electrode in which no electric field is applied, thereby extending an area subjected to the leakage of light.

Likewise, a dimension B1 is preferably as large as possible to avoid a short circuit with the auxiliary capacitive wiring 24 during laser cutting. However, the greater dimension B1 also results in a wider area between the contrast reduction preventive electrode 95 and the opposed electrode in which no field is applied, thereby extending an area subjected to the leakage of light.

The connection 202 is subjected to laser cutting during laser repair process. A dimension C1 of the connection 202 depends on the processing accuracy of a device used in the laser repair process. A repairing device capable of providing a high degree of processing accuracy realizes reduction of the dimension C1.

As discussed, the greater dimensions A1, A2 and A3 result in a wider area in which the transparent pixel electrode 91 does not exist. This widens an area between the contrast reduction preventive electrode 95 and the opposed electrode in which no electric field is applied, thereby extending an area subjected to the leakage of light to cause contrast reduction. Hence, the dimensions A1, B1 and C1 are preferably not more than 5 μm. More specifically, the slits 203 are preferably formed with the dimension A1=3 μm, B1=3 μm, and C1=5 μm.

<B. Manufacturing Process>

Next, the steps of manufacturing the semi-transparent liquid crystal display of the first preferred embodiment will be discussed with reference to FIGS. 4 through 11.

Figure 8:
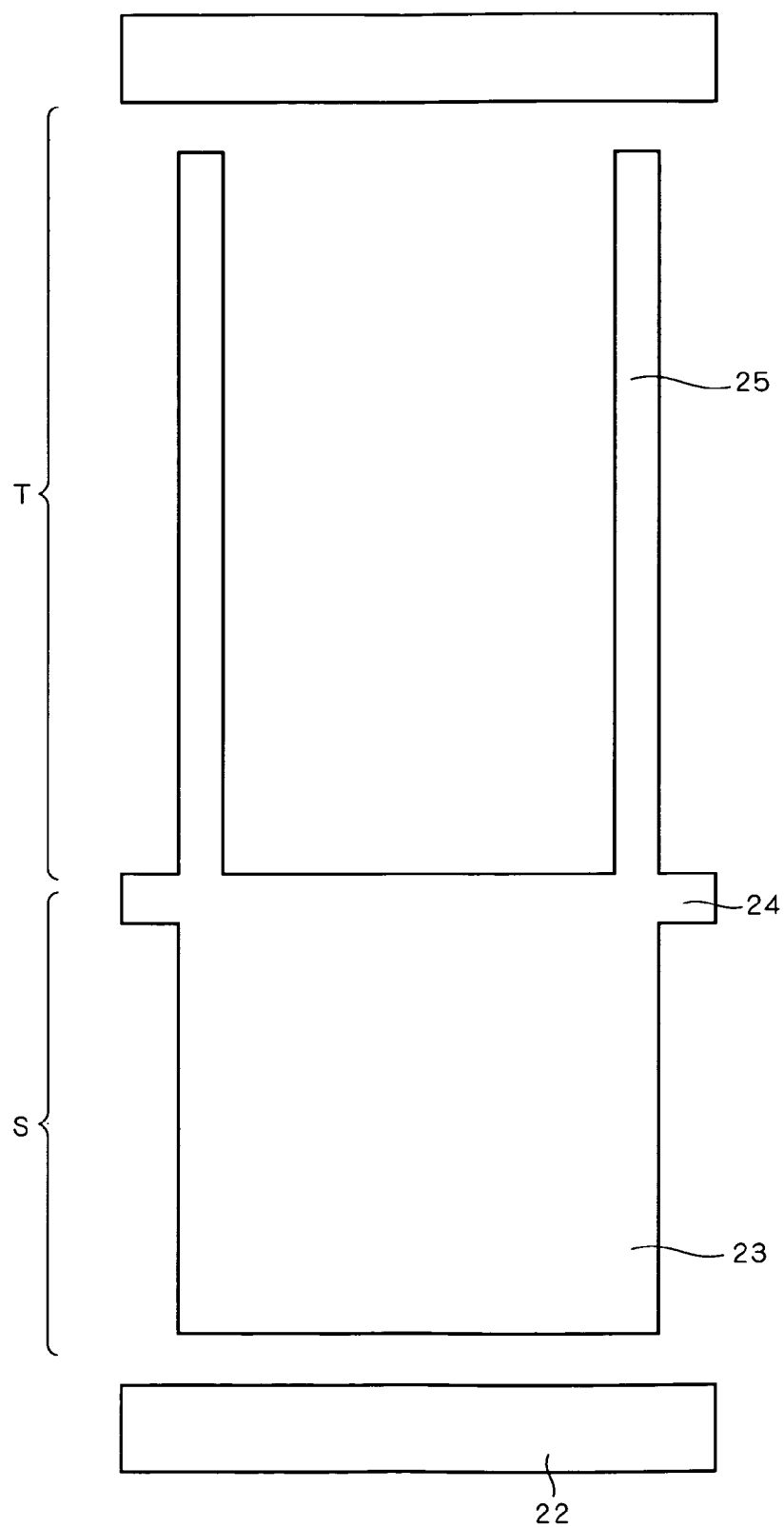
FIGS. 8 through 10 are top views showing the steps of manufacturing the semi-transparent TFT array substrate constituting the semi-transparent liquid crystal display according to the first preferred embodiment.

First, as shown in FIGS. 4 and 8, the transparent insulation substrate 1 such as a glass substrate is cleaned to purify its surface. Then the first conductive film is deposited by sputtering and the like on the transparent insulation substrate 1. The first conductive film is thereafter patterned.

As for the first conductive film, a thin film containing chromium (Cr), molybdenum (Mo), tantalum (Ta), titanium (Ti) or aluminum (Al) may be used. Alternatively, a thin film formed by alloying these metals as main components may be used. In the first preferred embodiment, a chromium film with a thickness of 400 nm is used as the first conductive film.

In a subsequent step, the contact hole 81 is defined above the first conductive film by dry etching, and a conductive thin film (transparent conductive film) for providing electrical connection is formed in the contact hole 81. Thus a thin metal film that is unlikely to generate surface oxidation, or a thin metal film capable of maintaining conductivity even when oxidized, is preferably used as the first conductive film.

When an aluminum-base material is used to form the first conductive film, an aluminum nitride film, or a film containing Cr, Mo, Ta or Ti may be formed on its surface in order to avoid degeneration of conductivity due to surface oxidation.

Next, the first conductive is patterned in a first photolithography process to form the gate electrode 21, gate wiring 22, first auxiliary capacitive electrode 23, auxiliary capacitive wiring 24, and second auxiliary capacitive electrode 25.

The first auxiliary capacitive electrode 23 is formed in the substantially entire area of the reflective region S. The second auxiliary capacitive electrode 25 is formed to run along the source wiring 63 discussed later. In a photolithography process, a substrate is cleaned, and a photosensitive resist is applied to the cleaned substrate and then dried. Thereafter the photosensitive resist is exposed through a mask formed into a predetermined pattern and is then developed, the mask pattern is transferred to the photosensitive resist on the substrate. Then the photosensitive resist is subjected to heat curing, followed by etching of the first conductive film and removal of the photosensitive resist.

The first conductive film is etched by wet etching using a publicly known etchant. As an example, when the first conductive film is formed by chromium, an aqueous solution containing a mixture of diammonium cerium nitrate and nitric acid is used.

In the etching of the first conductive film, in order to improve the coverage of the insulation film at the step height of the pattern edge to prevent a short circuit with another wiring at the step height, taper etching is preferably applied so that the cross section of the pattern edge has a tapered structure in the form of a trapezoid.

Figure 9:
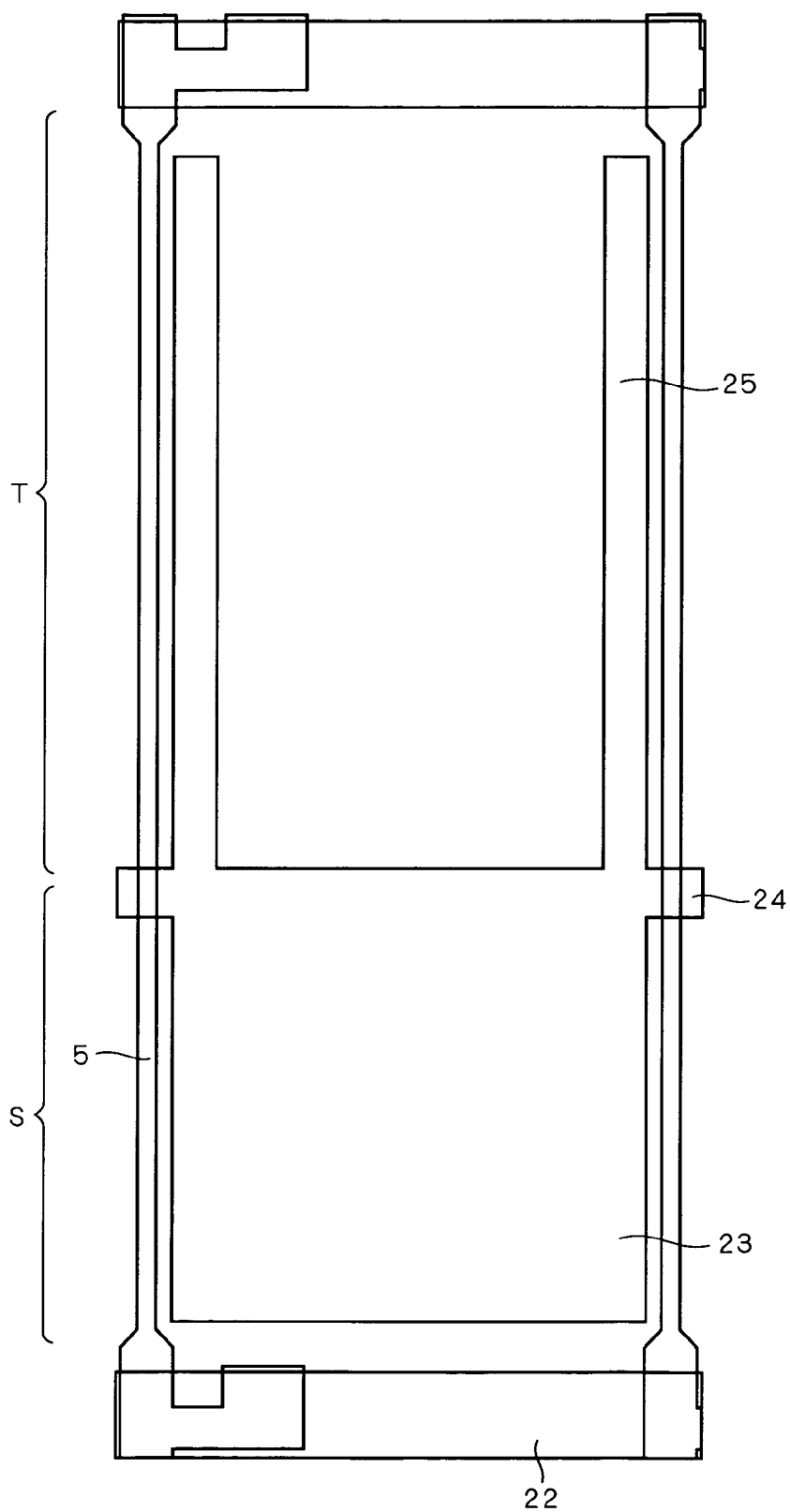

Next, with reference to FIGS. 5 and 9, the first insulation film 3, the semiconductor active film 4 and the ohmic contact film 5 are sequentially deposited for example by plasma CVD, and are thereafter patterned. As for the first insulation film 3 to serve as a gate insulation film, a monolayer film formed by an SiNx film, SiOy film or SiOzNw film may be used. Alternatively, a multi-layered film formed by a stack of these films may be used. Here, x, y, z and w are positive numbers representative of stoichiometry.

As for the thickness of the first insulation film 3, the smaller thickness is likely to cause a short circuit at the intersection of the gate wiring 22 and the source wiring 63, whereas the greater thickness reduces the ON current of the TFT to degenerate display characteristic. Thus the thickness of the first insulation film 3 is preferably as small as possible while maintaining a level greater than that of the first conductive film.

In order to avoid an interlayer short circuit caused by pinholes and the like, the first insulation film 3 is preferably formed by several deposition steps. In the first preferred embodiment, an SiN film with a thickness of 300 nm is deposited first and thereafter an SiN film with a thickness of 100 nm is deposited, thereby forming the first insulation film 3 formed by an SiN film with a thickness of 400 nm.

The semiconductor active film 4 may be an amorphous silicon (a-Si) film, a polysilicon (p-Si) film or the like. As for the thickness of the semiconductor active film 4, the smaller thickness will eliminate the semiconductor active film 4 during dry etching of the ohmic contact film 5 discussed later. On the other hand, the greater thickness reduces the ON current of the TFT. Thus the thickness of the semiconductor active film 4 is selected in consideration of the controlled amount of etching during dry etching of the ohmic contact film 5 and the value of the required ON current of the TFT. In the first preferred embodiment, the semiconductor active film 4 is formed by an a-Si film with a thickness of 150 nm.

As for the ohmic contact film 5, an n-type a-Si film doped with a slight amount of phosphorous, or an n-type p-Si film may be used. In the first preferred embodiment, the ohmic contact film 5 is formed by an n-type a-Si film with a thickness of 30 nm.

Next, the semiconductor active film 4 and the ohmic contact film 5 are patterned in a second photolithography process such that the semiconductor active film 4 and the ohmic contact film 5 remain at least in a portion in which the TFT portion is to be defined. In addition to this portion for defining the TFT portion, the semiconductor active film 4 and the ohmic contact film 5 also remain unremoved at the intersection of the gate wiring 22 and the source wiring 63, and in a portion in which the source wiring 63 is to be defined, to thereby increase breakdown voltage.

The semiconductor active film 4 and the ohmic contact film 5 are etched by dry etching using a publicly known combination of gases (such as a mixture of $SF_6$ and $O_2$ gases or a mixture of $CF_4$ and $O_2$ gases).

Figure 6:
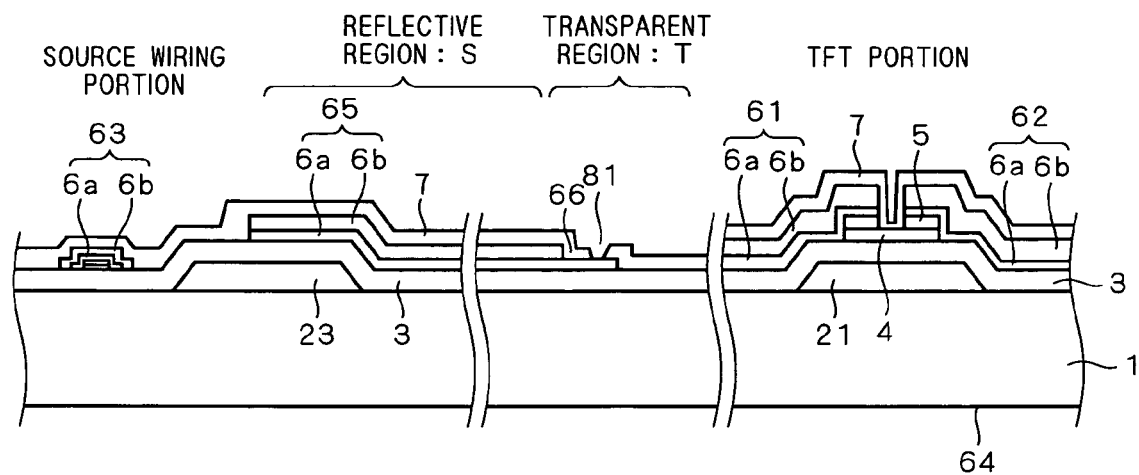
Figure 10:
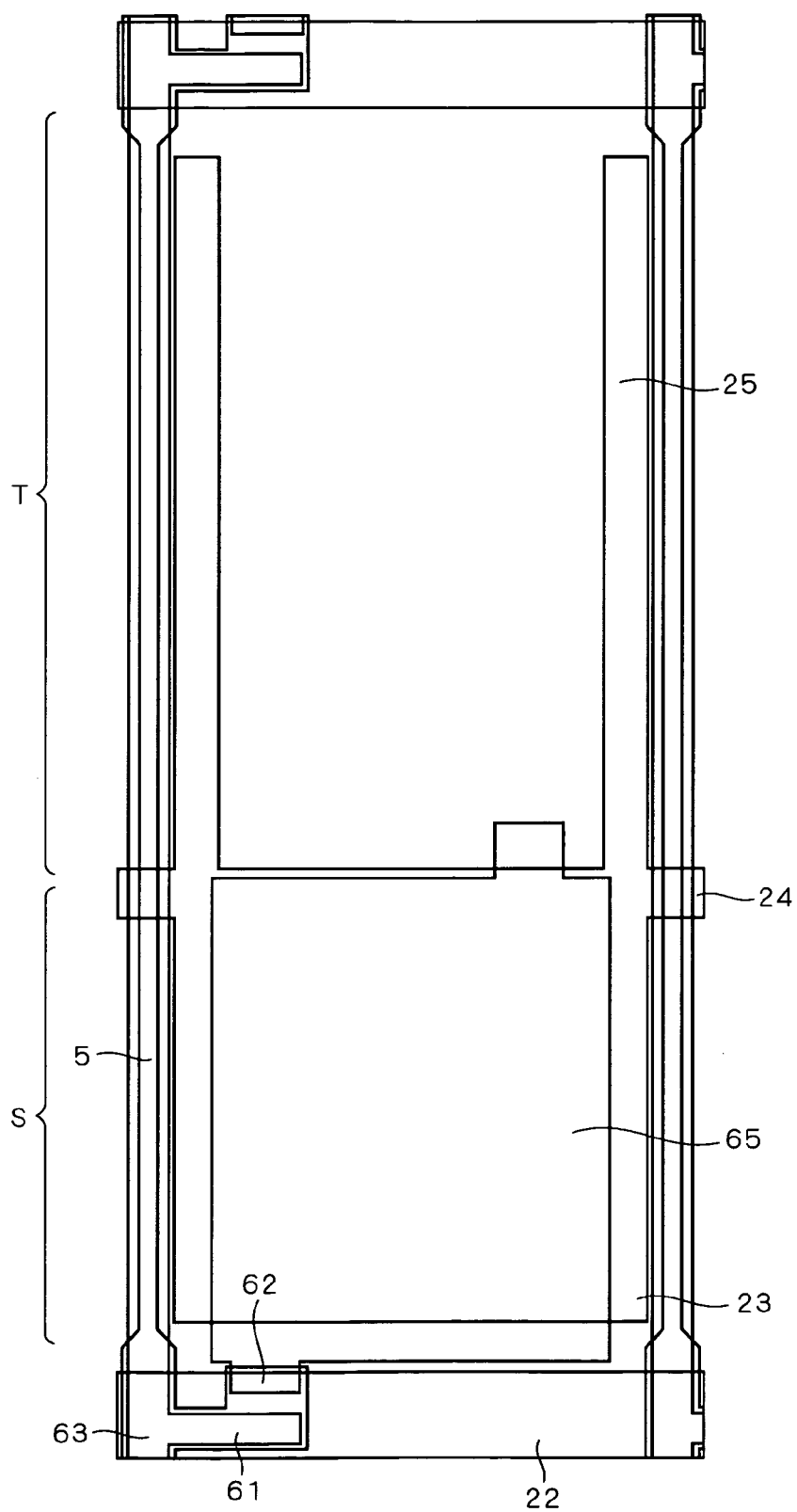

Next, with reference to FIGS. 6 and 10, the second conductive film is deposited by sputtering and the like, and is then patterned. The second conductive film includes a first layer 6a and a second layer 6b. As for the first layer 6a, a thin film containing chromium, molybdenum, tantalum or titanium may be used. Alternatively, a thin film formed by alloying these metals as main components may be used. As for the second layer 6b, a thin film containing aluminum or argentum (Ag), or a thin film formed by alloying these metals as main components may be used.

The first layer 6a is formed on the ohmic contact film 5 and the first insulation film 3 to form direct connection with the ohmic contact film 5 and the first insulation film 3. The second layer 6b is formed on the first layer 6a to be directly connected therewith. The second conductive film is intended for use as the source wiring 63 and the reflective pixel electrode 65, and thus should be formed in consideration of wiring resistance and reflective characteristic of the surface layer. In the first preferred embodiment, the first layer 6a of the second conductive film is formed by a chromium film with a thickness of 100 nm, and the second layer 6b thereof is formed by an AlCu film with a thickness of 300 nm.

Subsequently, the second conductive film is patterned in a third photolithography process to form the source wiring 63 with the source electrode 61, and the reflective pixel electrode 65 with the drain electrode 62. The drain electrode 62 and the reflective pixel electrode 65 are continuously formed in the same layer, so the drain electrode 62 and the reflective pixel electrode 65 are electrically connected in the same layer. The second conductive film is etched by wet etching using a publicly known etchant.

Next, the center part of the ohmic contact film 5 in the TFT portion is removed by etching to expose the semiconductor active film 4. The ohmic contact film 5 is etched by dry etching using a publicly known combination of gases (such as a mixture of $SF_6$ and $O_2$ gases or a mixture of $CF_4$ and $O_2$ gases).

Then the second layer 6b containing AlCu is removed at a portion for defining the contact hole 81 to provide a contact area 66. In the third photolithography process, halftone exposure process and the like is used to reduce the thickness of the photosensitive resist at the portion for defining the contact hole 81. After the dry etching of the ohmic contact film 5, the thickness of the photosensitive resist is reduced using for example an oxygen plasma to remove the photosensitive resist only at the portion for defining the contact hole 81. Further, the second layer 6b containing AlCu is subjected to set etching to thereby form the contact hole 81. As a result, the surface of the second conductive film contacting the transparent conductive film is defined by the first layer 6a containing chromium to thereby provide contact with high conductivity.

The halftone exposure process will be discussed. In the halftone exposure process, exposure is performed using a halftone mask that is formed for example by providing contrast to a patterned mask containing Cr, whereby exposure intensity is adjusted to control the thickness of the remaining photosensitive resist. Thereafter the second layer 6b is etched at the portion in which the photosensitive resist is completely removed.

Next, the thickness of the photosensitive resist is reduced using an oxygen plasma and the like to remove the remaining photosensitive resist with a small thickness. Then, the second layer 6b is etched at the portion in which the photosensitive resist with a small thickness remained (and already removed at this stage). As a result, two patterning steps can be realized in one photolithography process.

When the surface of the second conductive film is provided with an aluminum nitride (AlCuN) alloy and the like thereon, while a reflectance is slightly reduced, a good contact can be obtained with the transparent conductive film 91 discussed later. Thus the above-described step of defining the contact area 66 can be omitted.

Next, the second insulation film 7 is deposited for example by plasma CVD. The second insulation film 7 is formed by the same material as that of the first insulation film 3. The thickness of the second insulation film 7 is preferably determined in consideration of the coverage of the underlayer pattern. In the first preferred embodiment, an SiN film with a thickness of 500 nm is used as the second insulation film 7.

Subsequently, the second insulation film 7 is patterned in a fourth photolithography process to define the contact hole 81 on the reflective pixel electrode 65. The second insulation film 7 is etched by wet etching using a publicly known etchant, or by dry etching using a publicly known combination of gases.

Figure 7:
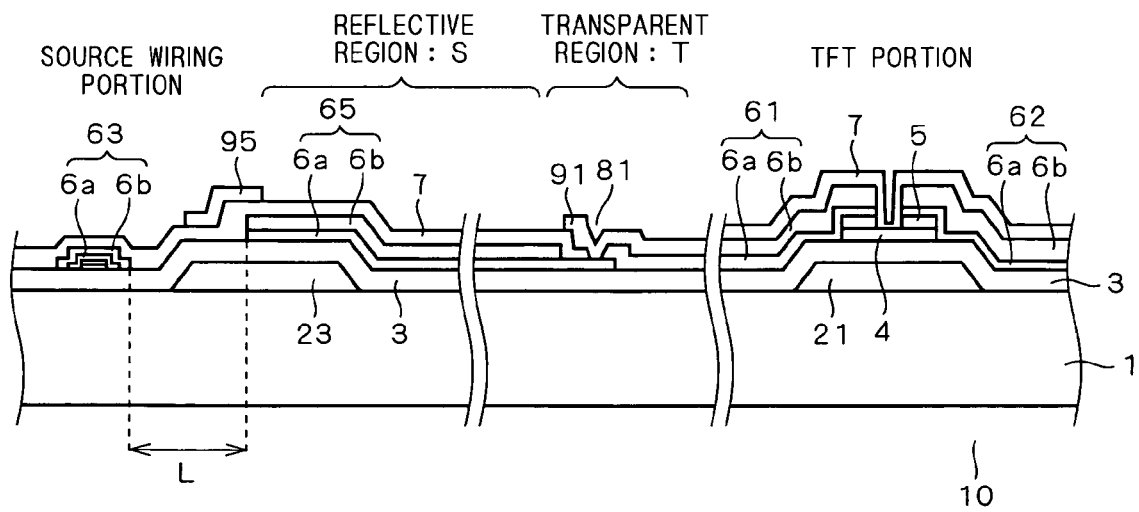
Figure 11:
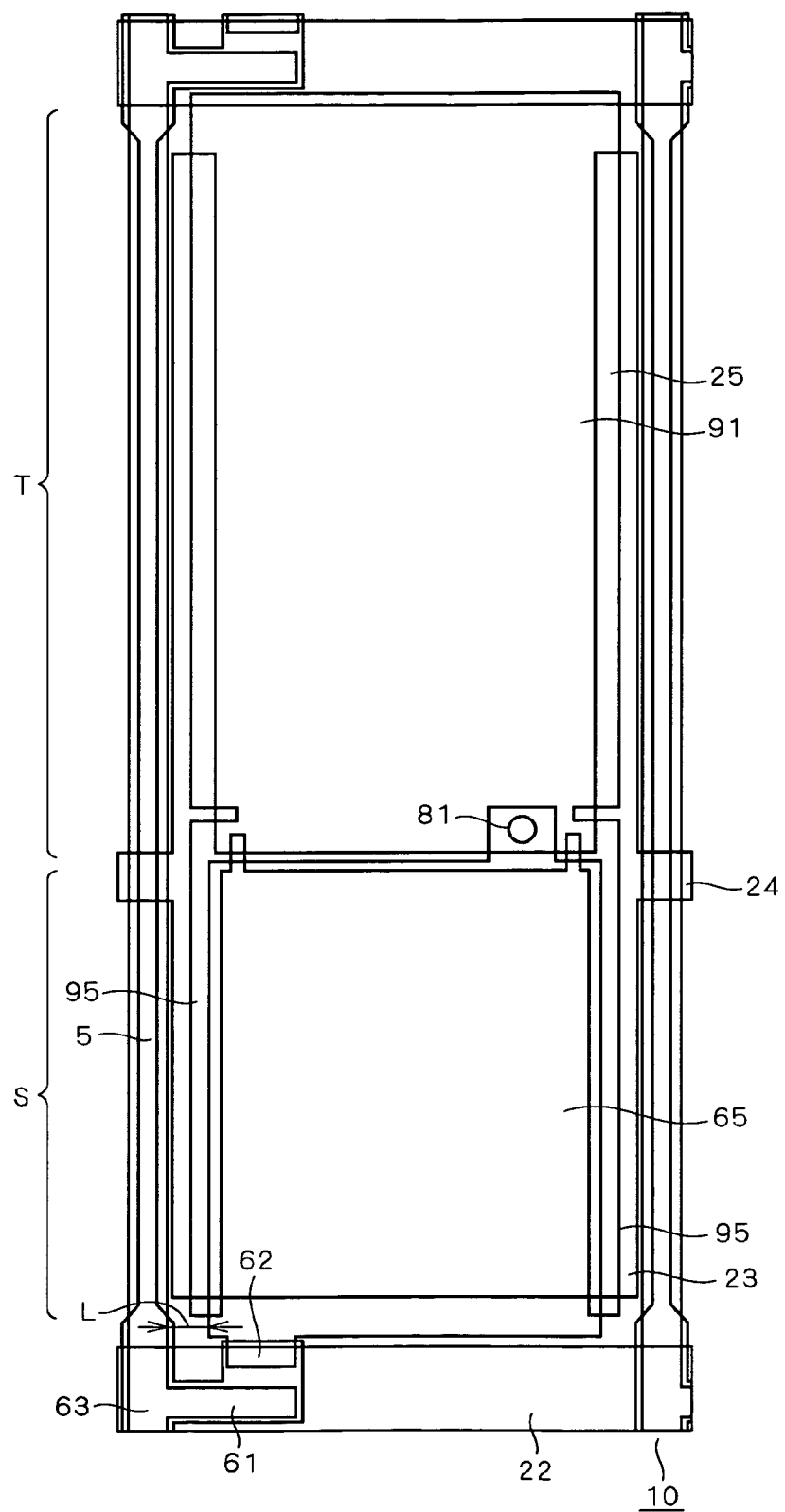
FIG. 11 is a sectional view showing the step of manufacturing the semi-transparent TFT array substrate constituting the semi-transparent liquid crystal display according to the first preferred embodiment.

Next, with reference to FIGS. 7 and 11, a transparent conductive film is deposited for example by sputtering, and is then patterned. An ITO or $SnO_2$ film may be used as the transparent conductive film. Specifically, an ITO film is preferable in terms of chemical stability. The transparent conductive film may be either a crystallized ITO or amorphous ITO (a-ITO) film. When an a-ITO film is used, this a-ITO film should be heated up to a temperature of 180° C. or higher after being patterned to be crystallized. In the first preferred embodiment, an a-ITO film with a thickness of 80 nm is used as the transparent conductive film.

Next, the transparent conductive film is patterned in a fifth photolithography process to form the transparent pixel electrode 91 in the transparent region T. In consideration of deviation and the like during patterning, the transparent pixel electrode 91 is formed such that the transparent pixel electrode 91 partially overlaps the reflective pixel electrode 65 through the second insulation film 7 at the boundary between the reflective region S and the transparent region T. The transparent conductive film is not defined in the reflective region except for the boundary to prevent the reduction of reflectance.

The voltage drop between the transparent conductive film and the first, second insulation films 3, 7 is prevented. Thus the transparent pixel electrode 91 and the reflective pixel electrode 65 can be kept at substantially the same potential. The side wall of the contact hole 81 at the connection between the reflective pixel electrode 65 and the transparent pixel electrode 91 is covered with the transparent conductive film.

In the first preferred embodiment, the contrast reduction preventive electrode 95 is formed by the transparent conductive film to be arranged over the space L between the reflective pixel electrode 65 and the source wiring 63, with the second insulation film 7 being held between the contrast reduction preventive electrode 95 and the space L. The contrast reduction preventive electrode 95 is formed along and substantially parallel with the source wiring 63, while overlapping the auxiliary capacitive electrode 23.

With reference to FIG. 1, the contrast reduction preventive electrode 95 is formed such that the contrast reduction preventive electrode 95 extends at least from a terminal end of the reflective pixel electrode 65 formed to face the source wiring 63 to a position corresponding to a boundary R for defining the black matrix of an opposed substrate (discussed later). The contrast reduction preventive electrode 95 may partially overlap a part of the reflective pixel electrode 65 with the first and second insulation films 3 and 7 held therebetween. The contrast reduction preventive electrode 95 may be formed more extensively than the transparent pixel electrode 91 to realize the simplification of the manufacturing process steps.

The TFT array substrate 10 thereby formed is coated with an alignment film in a subsequent cell encapsulation step, and thereafter, subjected to rubbing in a predetermined direction. Likewise, the opposed substrate (not shown) facing the TFT array substrate 10 is provided with a black matrix surrounding a pixel region on a different transparent insulation substrate. A color filter is formed in this surrounded pixel region. The color filter has a protective film, an opposed transparent electrode and the like deposited in its upper layer, and is coated with an alignment film to be subjected to rubbing.

These TFT array substrate 10 and the opposed substrate are superimposed on each other with a spacer held therebetween, such that the respective alignment films are opposed to each other. The peripheral portions of the substrates are bonded by a sealing member and liquid crystal is encapsulated between the substrates. Polarization plates are attached to both surfaces of the liquid crystal cell thereby formed and a backlight unit is attached to the rear surface thereof, whereby the semi-transparent liquid crystal display is completed.

A transparent organic film is formed in a part of the opposed substrate that faces the reflective region S of the TFT array substrate 10. Further, the thickness of the liquid crystal layer in the reflective region S is controlled to be smaller than that in the transparent region T, whereby electro-optical characteristics of reflectance and transparency can be balanced.

Figure 12:
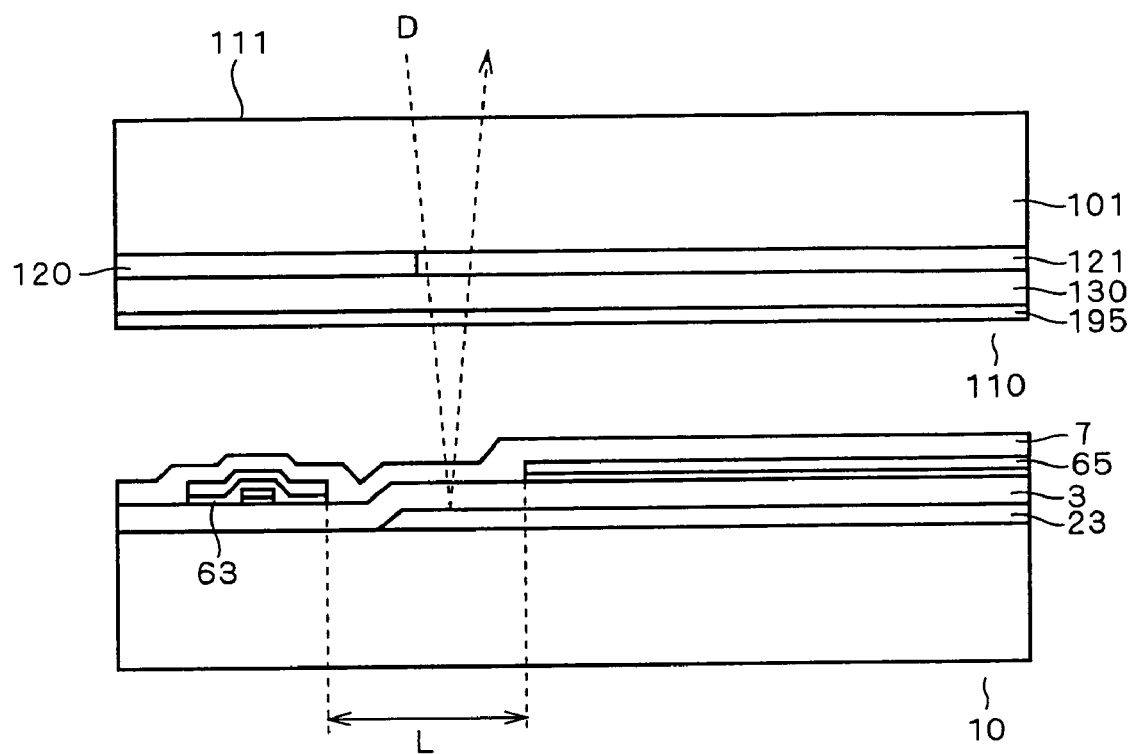
FIG. 12 is a sectional view showing a semi-transparent TFT array substrate and an opposed substrate constituting a conventional semi-transparent liquid crystal display.
Figure 13:
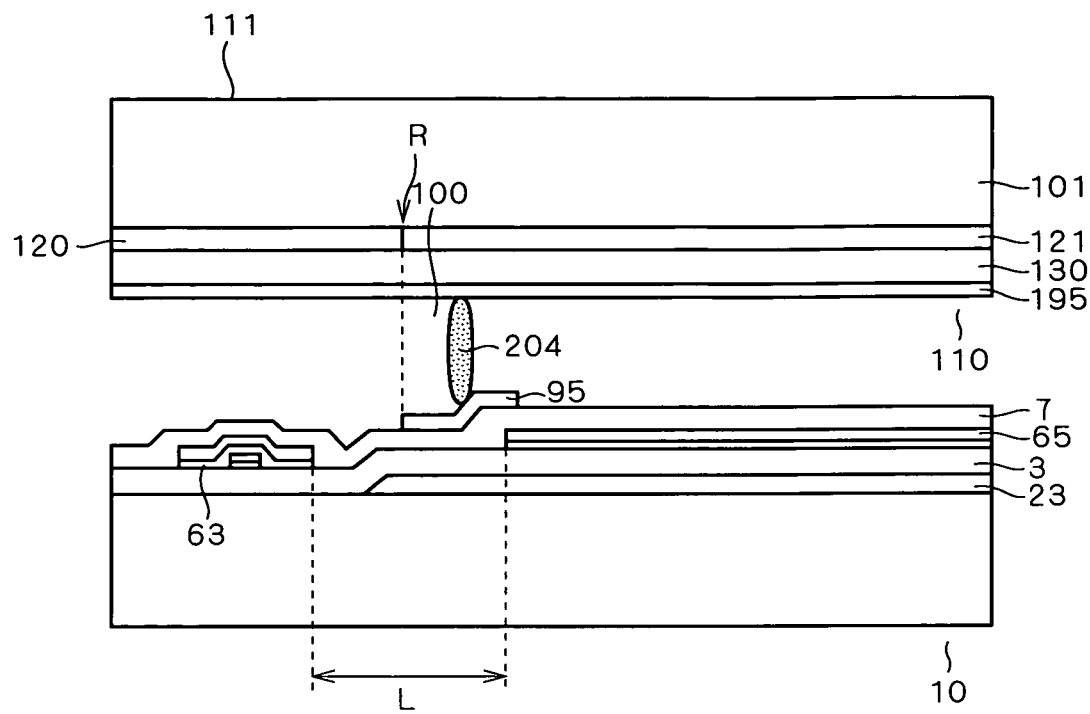
FIG. 13 is a sectional view showing the semi-transparent TFT array substrate and an opposed substrate constituting the semi-transparent liquid crystal display according to the first preferred embodiment.

FIG. 12 shows a sectional view of the conventional TFT array substrate 10 and a sectional view of an opposed substrate facing this TFT array substrate 10. FIG. 13 shows a sectional view taken along the arrow A-A in FIG. 1, and a sectional view of an opposed substrate facing this TFT array substrate 10.

<C. Operation>

The operation of the present invention will be described with reference to FIGS. 12 and 13. In FIGS. 12 and 13, an opposed substrate 110 arranged to face the TFT array substrate 10 includes an opposed transparent insulation substrate 101, and a black matrix 120, a color filter 121, an overcoat layer 130 and an opposed transparent electrode 195 formed on the opposed transparent insulation substrate 101.

FIG. 13 shows a state in which a short circuit is generated due to the existence of a foreign conductive substance 204 between the surfaces of the contrast reduction preventive electrode 95 and the opposed electrode 195.

With reference to FIG. 12, when an electric field is applied to the conventional semi-transparent liquid crystal display adopting a commonly-used normally white mode (a mode realizing white display in the absence of application of an electric field), the auxiliary capacitive electrode 23 formed in the space L between the source wiring 63 and the reflective pixel electrode 65 and the opposed electrode 195 on the opposed electrode substrate 110 are at substantially the same potential, whereby no electric field is applied to a part of a liquid crystal layer 100 defined between the auxiliary capacitive electrode 23 and the opposed electrode 195. This results in a state in which white display is always maintained.

As a result, light entering from a display surface 111 (surface allowing ambient light to pass therethrough) is reflected by the auxiliary capacitive electrode 23 to go outside through the display surface 111 as indicated by D in FIG. 12. This results in reflective contrast reduction.

In the present invention, the contrast reduction preventive electrode 95 is formed over the space L between the source wiring 63 and the reflective pixel electrode 65 with the first and second insulation films 3 and 7 being held between the contrast reduction preventive electrode 95 and the space L, such that the contrast reduction preventive electrode 95 is defined within the space L while extending from a terminal end of the reflective pixel electrode 65 formed to face the source wiring 63 to a position corresponding to the boundary R for defining the black matrix of the opposed substrate. Thus an electric field is applied at least to the liquid crystal layer 100 defined between the contrast reduction preventive electrode 95 and the opposed electrode 195. As a result, light reflected by the auxiliary capacitive electrode 23 in the space L does not go outside through the display surface 111, thereby to provide excellent display characteristic with high reflective contrast.

Here, when a short circuit is generated due to the foreign conductive substance 204 as shown in FIG. 13, the contrast reduction preventive electrode 95 is cut off from the transparent pixel electrode 91 at the connection 202 to avoid the short circuit.

As the connection 202 is spaced apart from the auxiliary capacitive wiring 24, no short circuit will occur between the transparent pixel electrode 91 and the auxiliary capacitive wiring 24 when the contrast reduction preventive electrode 95 is cut off.

The connection 202 is held between the pair of slits 203 formed in the transparent pixel electrode 91 or the contrast reduction preventive electrode 95, and hence, has a small width. Thus the contrast reduction preventive electrode 95 can be easily cut off at the connection 202.

<D. Effect>

As discussed above, in the TFT array substrate 10 of the first preferred embodiment, the connection 202 for connecting the contrast reduction preventive electrode 95 and the transparent pixel electrode 91 is provided, in such a position that the connection 202 does not overlap the auxiliary capacitive wiring 24 in plan view.

As a result, when the contrast reduction preventive electrode 95 is cut off at the connection 202, no short circuit will occur between the transparent pixel electrode 91 and the auxiliary capacitive wiring 24.

The connection 202 is held between the pair of slits 203 formed in the transparent pixel electrode 91 or the contrast reduction preventive electrode 95.

Thus the connection 202 held between the pair of slits 203 has a small width. As a result, the contrast reduction preventive electrode 95 can be easily cut off at the connection 202.

The semi-transparent liquid crystal display of the first preferred embodiment includes the above-described TFT array substrate 10. Accordingly, when a pixel generating a point defect caused by a short circuit is to be repaired, the transparent pixel electrode 91 and the auxiliary capacitive wiring 24 of this pixel can be prevented from being short circuited with each other.

Second Preferred Embodiment

<A. Structure>

Figure 14:
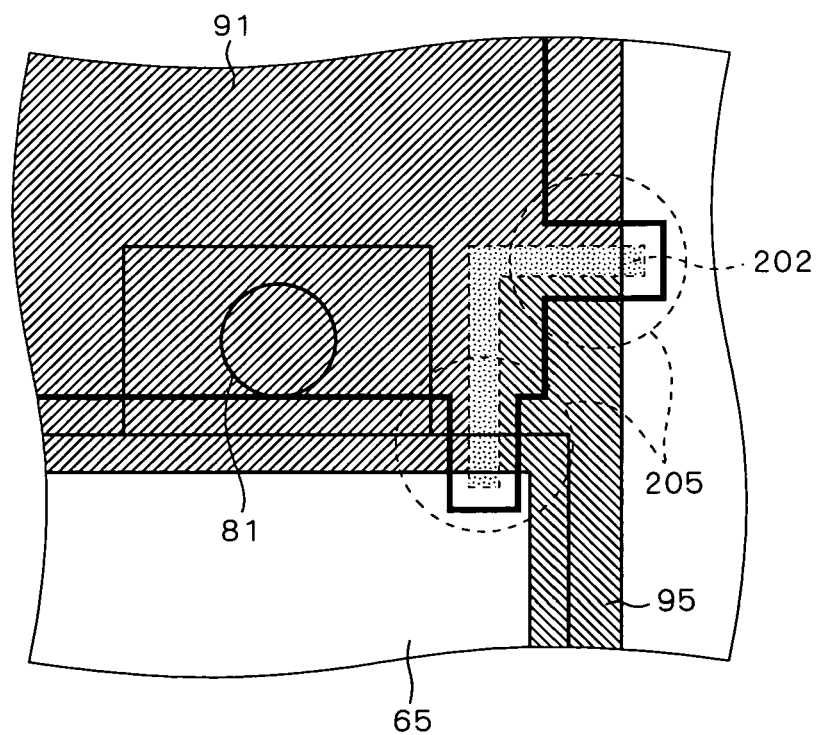
FIG. 14 is an enlarged top view showing the vicinity of a connection of a transparent pixel electrode in a semi-transparent TFT array substrate constituting a semi-transparent liquid crystal display according to a second preferred embodiment of the present invention.

FIG. 14 is an enlarged top view showing the TFT array substrate 10 constituting a semi-transparent liquid crystal display according to a second preferred embodiment of the present invention.

In the TFT array substrate 10 of the second preferred embodiment, the pair of slits 203 (see FIGS. 1 and 3) is replaced by slits 205 formed in the auxiliary capacitive wiring 24.

The connection 202 for connecting the contrast reduction preventive electrode 95 and the transparent pixel electrode 91 is arranged such that the connection 202 corresponds in position to the slits 205 formed in the auxiliary capacitive wiring 24 in plan view.

Thus the auxiliary capacitive wiring 24 does not overlap the connection 202.

The other structures are the same as those of the first preferred embodiment, and will not be repeatedly discussed.

<B. Operation>

In the steps of manufacturing a panel, laser repair process is performed while viewing an image of the rear surface of the TFT array substrate 10.

While viewing the image, the transparent pixel electrode 91 is cut off from the rear surface by laser cutting along the connection 202 shown in FIG. 14. Then the contrast reduction preventive electrode 95 is cut off from the transparent pixel electrode 91.

<C. Effect>

In the steps of manufacturing a panel, an image of the rear surface of the TFT array substrate 10 should be viewed to perform the laser repair process.

The transparent pixel electrode 91 formed in the uppermost layer has transparency, and hence it is difficult to visually recognize the connection 202 of the transparent pixel electrode 91.

In the semi-transparent liquid crystal display of the second preferred embodiment, the slits 205 are formed in the auxiliary capacitive wiring 24. Thus a location of laser cutting can be visually recognized.

As a result, the contrast reduction preventive electrode 95 can be easily cut off. At this time, the connection 202 between the contrast reduction preventive electrode 95 and the transparent pixel electrode 91 and the auxiliary capacitive wiring 24 do not overlap each other in plan view by the existence of the slits 205 formed in the auxiliary capacitive wiring 24. Thus the transparent pixel electrode 91 and the auxiliary capacitive wiring 24 are not short circuited with each other after laser cutting.

The semi-transparent liquid crystal display of the second preferred embodiment includes the above-described TFT array substrate 10. Accordingly, when a pixel generating a point defect caused by a short circuit is to be repaired, the transparent pixel electrode 91 and the auxiliary capacitive wiring 24 of this pixel can be prevented from being short circuited with each other. Further, a location of laser cutting can be easily specified.

Third Preferred Embodiment

<A. Structure>

FIG. 15 is an enlarged top view showing a connection formed in a transparent pixel electrode of the TFT array substrate 10 that constitutes a semi-transparent liquid crystal display according to a third preferred embodiment of the present invention.

The TFT array substrate 10 of the third preferred embodiment is a combination of the TFT array substrate 10 of the first preferred embodiment and that of the second preferred embodiment. The same structures as those of the first or second preferred embodiment are designated by the same reference numerals, and will not be repeatedly discussed.

With reference to FIG. 15, the pair of slits 203 is formed in the transparent pixel electrode 91 or the contrast reduction preventive electrode 95. Further, the slits 205 are formed in the auxiliary capacitive wiring 24.

<B. Effect>

The TFT array substrate 10 of the third preferred embodiment is formed by incorporating the pair of slits 203 in the transparent pixel electrode 91 or the contrast reduction preventive electrode 95 in the uppermost layer into the TFT array substrate 10 of the second preferred embodiment.

Thus in the TFT array substrate 10 of the third preferred embodiment, as a result of the existence of the slits 203, the connection 202 arranged so as to correspond in position to the slits 205 is smaller in width than the connection 202 in the TFT array substrate 10 of the second preferred embodiment.

As a result, the contrast reduction preventive electrode 95 can be more easily cut off from the transparent pixel electrode 91 than in the TFT array substrate 10 of the second preferred embodiment.

The semi-transparent liquid crystal display of the third preferred embodiment includes the above-described TFT array substrate 10. Accordingly, when a pixel generating a point defect caused by a short circuit is to be repaired, the transparent pixel electrode 91 and the auxiliary capacitive wiring 24 of this pixel can be prevented from being short circuited with each other. Further, a location of laser cutting can be easily specified.

While the invention has been shown and described in detail, the foregoing description is in all aspects illustrative and not restrictive. It is therefore understood that numerous modifications and variations can be devised without departing from the scope of the invention.

What is claimed is:

1. A semi-transparent TFT array substrate, comprising:
    a TFT including a source electrode, a gate electrode, and a drain electrode;
    an auxiliary capacitive wiring including an auxiliary capacitive electrode on an insulation substrate;
    a transparent pixel electrode in a transparent region and above said insulation substrate, said transparent pixel electrode including an electrode extending from a corner of the rest of said transparent pixel electrode to an edge of the auxiliary capacitive wiring closest to a gate wiring connected to the gate electrode;
    a source wiring connected to the source electrode; and
    a reflective pixel electrode in a reflective region, a space existing between the reflective pixel electrode and the source wiring, the auxiliary capacitive wiring overlapping the space, said electrode being disposed between the reflective pixel electrode and the source wiring, wherein a connection which connects said electrode and the rest of said transparent pixel electrode does not overlap said auxiliary capacitive wiring in a plan view, and the connection does not overlap the gate wiring.

2. The semi-transparent TFT array substrate according to claim 1, wherein said connection is held between a pair of slits formed in said transparent pixel electrode or in said electrode.

3. A semi-transparent liquid crystal display with the semi-transparent TFT array substrate as recited in claim 1.

4. The semi-transparent TFT array substrate according to claim 1, wherein said electrode is disposed at an area in which said auxiliary capacitive wiring is not covered by the reflective pixel electrode.

5. The semi-transparent TFT array substrate according to claim 1, wherein the auxiliary capacitive wiring extends closer to the source wiring than does the electrode.

6. The semi-transparent TFT array substrate according to claim 1, wherein a conductive film includes the source wiring and the reflective pixel electrode.

7. The semi-transparent TFT array substrate according to claim 1, further comprising:
    a contact hole electrically connecting said transparent pixel electrode and said reflective pixel electrode.

8. The semi-transparent TFT array substrate according to claim 1, wherein said electrode has a width, in the plan view, that is less than half of a width of said transparent pixel electrode in the plan view.

* * * * *